(12) United States Patent
Van Oost et al.

(10) Patent No.: US 10,270,517 B2
(45) Date of Patent: Apr. 23, 2019

(54) METHOD OF SELECTIVELY ENABLING A WIRELESS ACCESS POINT OR REPEATER

(71) Applicant: THOMSON LICENSING, Issy les Moulineaux (FR)

(72) Inventors: Koen Van Oost, Borsbeek (BE); Stijn Segers, Lint (BE); Frederik Verwaest, Mol (BE)

(73) Assignee: Interdigital CE Patent Holdings (FR)

( * ) Notice: Subject to any disclaimer, the term of this patent is extended or adjusted under 35 U.S.C. 154(b) by 0 days.

(21) Appl. No.: 15/536,862

(22) PCT Filed: Dec. 14, 2015

(86) PCT No.: PCT/EP2015/079517
§ 371 (c)(1),
(2) Date: Jun. 16, 2017

(87) PCT Pub. No.: WO2016/096679
PCT Pub. Date: Jun. 23, 2016

(65) Prior Publication Data
US 2017/0366249 A1    Dec. 21, 2017

(30) Foreign Application Priority Data

Dec. 16, 2014 (EP) .................................... 14307045

(51) Int. Cl.
*H04B 7/15* (2006.01)
*H04B 7/155* (2006.01)
(Continued)

(52) U.S. Cl.
CPC ........ *H04B 7/15557* (2013.01); *H04W 24/02* (2013.01); *H04W 52/0206* (2013.01);
(Continued)

(58) Field of Classification Search
CPC .............. H04B 7/15557; H04W 24/02; H04W 52/0206; H04W 84/12; H04W 28/08; Y02D 70/00; Y02D 70/142; Y02D 70/144
See application file for complete search history.

(56) References Cited

U.S. PATENT DOCUMENTS

| 7,031,722 B2 * | 4/2006 | Naghian | .................... G01S 5/06 342/457 |
| 7,415,242 B1 * | 8/2008 | Ngan | .................. H04B 7/15557 455/11.1 |

(Continued)

FOREIGN PATENT DOCUMENTS

| EP | 2262329 | 12/2010 |
| JP | 2012010261 | 1/2012 |

(Continued)

*Primary Examiner* — Mohamed A Kamara
(74) *Attorney, Agent, or Firm* — Joe Oplach; Jerome G. Schaefer

(57) ABSTRACT

A method of selectively enabling one of a first and a second operating mode in a first network device is presented. The first network device has a wireless receiver and transmitter for providing bi-directional communication with a mobile station through a first wireless link, for providing access to a network. In the first operating mode the wireless transmitter is not continuously enabled, and in the second operating mode the wireless transmitter is continuously enabled. In the first operating mode the first network device, receives, from a second network device, status information about a second wireless link maintained between the second network device and the mobile station, and sends, at predetermined time intervals, probe requests to the mobile station. The wireless transmitter is enabled for sending the probe request and disabled thereafter. The first network device receives a response to the probe request from the mobile station and determines a spatial distance of the mobile station to the first network device and to the second network (Continued)

device. Depending on the determined distance the first network device switches to the second operating mode, allowing association of the mobile station with the first network device via the first wireless link.

12 Claims, 7 Drawing Sheets

(51) Int. Cl.
*H04W 24/02* (2009.01)
*H04W 52/02* (2009.01)
*H04W 84/12* (2009.01)

(52) U.S. Cl.
CPC .............. *H04W 84/12* (2013.01); *Y02D 70/00* (2018.01); *Y02D 70/1222* (2018.01); *Y02D 70/1242* (2018.01); *Y02D 70/1262* (2018.01); *Y02D 70/142* (2018.01); *Y02D 70/144* (2018.01); *Y02D 70/23* (2018.01)

(56) References Cited

U.S. PATENT DOCUMENTS

| | | | |
|---|---|---|---|
| 7,809,328 | B2 | 10/2010 | Nishimura |
| 8,452,232 | B2 | 5/2013 | Cho |
| 9,544,782 | B2* | 1/2017 | Vardhan ............. H04B 7/15507 |
| 2003/0013455 | A1* | 1/2003 | Shoji ..................... H04W 16/10 455/452.1 |
| 2007/0008889 | A1 | 1/2007 | Seo |
| 2012/0157099 | A1 | 6/2012 | Matsumoto |
| 2016/0066201 | A1* | 3/2016 | Kerpez ................ H04W 24/02 370/252 |

FOREIGN PATENT DOCUMENTS

| | | |
|---|---|---|
| JP | 2012169761 | 6/2012 |
| KR | 2011042590 | 4/2011 |
| WO | WO2008131588 | 11/2008 |

* cited by examiner

METHOD OF SELECTIVELY ENABLING A WIRELESS ACCESS POINT OR REPEATER

This application claims the benefit, under 35 U.S.C. § 365 of International Application PCT/EP2015/079517, filed Dec. 14, 2015, which was published in accordance with PCT Article 21(2) on Jun. 23, 2016, in English, and which claims the benefit of European Patent Application 14307045.6, filed Dec. 16, 2014.

FIELD

The invention pertains to wireless communication networks, in particular to dynamically controlling the network topology and managing devices providing access to wireless communication, including dynamically enabling or disabling wireless access points or repeaters.

BACKGROUND

Throughout this specification the terms wireless LAN, WLAN, Wi-Fi™, IEEE 802.11 are used interchangeably unless otherwise noted. The term wireless access point, also referred to by its abbreviation AP, refers to a device that provides wireless access to a network, e.g. the Internet, a local area network (LAN), or a wide area network (WAN). An AP may or may not include functionalities of a router or a gateway, and may be an integrated part of such devices. SSID is an abbreviation for Service Set Identifier and refers, inter alia, to the name of a wireless network by which it can be distinguished from other wireless networks. A wireless repeater, or RP, is a device that extends the reach of the wireless network provided by an AP, using the same SSID. A repeater may operate on the same channel or on a different channel than the AP its reach it extends. A repeater may be connected with the AP via a wired or wireless link. A device implementing an AP may function as a repeater. The term mobile station, or MS, refers to a mobile device that can be wirelessly connected to an AP for accessing the network. The term association refers to the process of establishing a connection between a MS and a particular AP, and the term disassociation refers to the process of terminating the connection between a MS and a particular AP. Before a MS can associate with an AP it typically must terminate any previous connection with a different AP (disassociate), if applicable.

Mobility and roaming is a key issue in wireless networks, and users expect their tablet computers, laptops etc. to be connected to a network at any time. Like with a mobile phone users want to stay connected to the wireless networks while moving around. In the case of Wi-Fi™ networks and in IEEE 802.11 terminology, this means keeping the wireless interface of the mobile station associated with an access point, this mode of operation being referred to as infrastructure mode. In telecommunication networks, the association process is controlled by the network itself. In WiFi networks, however, decisions on associating with or disassociating from an AP are entirely left to the mobile station. Hence, a mobile station must scan potential channels to discover new access points and request association. Moreover, the interconnection network must react to these successive associations, by keeping bridging and routing tables up to date, or by allocating a new IP addresses for example. These procedures cause variability in the delays during mobility, degrading significantly the quality of service for constrained traffic, like voice over IP. Furthermore, since the mobility decisions are taken in the station, it is impossible to provide efficient resource management in the network of access points, for load balancing or interference mitigation.

Some wireless networks, notably WiFi networks, use repeaters for providing proper signal coverage in a larger area that cannot be covered by a single AP. However, active repeaters use and occupy a portion of the limited bandwidth of the shared wireless medium even if not needed, i.e. when no mobile station is associated with the repeater, since they transmit their SSID beacon signal and management frames at regular intervals. The narrow frequency band around 2.4 GHz is shared between various wireless networks including IEEE 802.11 wireless LAN, IEEE802.15 Bluetooth and the like, and is relatively crowded. The 5 GHz band is larger and provides more alternative channels that can be used, but devices operating in this frequency band are less common as of today, and the range of a 5 GHz connection is typically smaller than that of a 2.4 GHz connection, mostly due to higher signal attenuation. As such, it is desirable to avoid unnecessarily using the limited shared resource whenever possible. In addition, an active repeater consumes power, and it is generally desirable to reduce the power consumption of devices when they are not used.

SUMMARY

The present method suggests dynamically enabling and disabling a WLAN repeater in response to an analysis of wireless network conditions. As will be shown hereafter, in accordance with the present method the WLAN repeater must be capable of providing wireless access to a network and must also be capable of acting as a kind of network client, either wired or wireless. The present method uses probe request/response frames stipulated in the IEEE 802.11 standard to identify whether or not a repeater is needed. The repeater will collect data and through communication with the main access point or master access point will decide whether to enable or disable the repeater functionality, hence allowing power saving mechanisms to start or stop dynamically based on the device's current role.

In accordance with the present method, one of a first and a second operating mode is enabled in a first network device that provides access to a network, e.g. the Internet or a local area network, or LAN. The first network device has a wireless receiver and wireless transmitter for providing bi-directional communication with a mobile station through a first wireless link. The bi-directional communication may be half-duplex. In the first operating mode, the wireless transmitter is not continuously enabled, and in the second operating mode, the wireless transmitter is continuously enabled. The method includes, at the first network device and in the first operating mode, receiving, from a second network device, status information about a second wireless link between the second network device and the mobile station. The information about the second wireless link may pertain to a currently active link or to a link that had previously existed, but currently is not active.

In accordance with the present method the first network device receives, at the wireless receiver, a response from the mobile station to a probe request previously sent from the first network device to the mobile station, wherein the wireless transmitter is enabled for sending the probe request and disabled thereafter.

The first network device may send probe requests at predetermined time intervals or in response to an external trigger. An external trigger is for example a request from the second network device to the first network device to send probe requests.

The first network device determines, from the received status information and information extracted from the response to the outgoing probe request, a spatial distance of the mobile station to the first network device and to the second network device. Depending on the determined distance the first network device switches from the first operating mode to the second operating mode, i.e. it enables its wireless transmitter and provides a repeater functionality, allowing association of the mobile station with the first network device via the first wireless link, and providing access of the mobile station to the network.

In variant of the present method, the first network device, in the first operating mode, does not actively send probe requests for triggering probe responses that are then received. Rather, the first network device listens to probe responses transmitted by mobile stations in response to probe requests from other network devices, and compares the status information with status information for the mobile stations that are stored in a memory of the first network device. If the first network device is not actively connected to the network, and if the evaluation of the status information obtained through listening and from the memory indicates that a mobile station would benefit from the first network device switching to the second operating mode, the first network device establishes an active connection to the network and switches to the second operating mode. It is to be noted that in all embodiments and variants discussed in this specification the first network device may have direct access to the network or may have access to the network through the second network device. Direct access to the network or access to the second network device may be made through a wired or a wireless link.

In an embodiment of the preceding variant of the method, in case the first network device receives unsolicited probe requests the first network device checks if the mobile station sending the probe request had previously been associated with the first network device, by accessing a database maintained in the first network device. If a new device is discovered while in listening mode, i.e. a device that was not previously associated, the first network device communicates with the second network device for obtaining status information for the new device. This may include establishing an active connection with the second network device, if the connection was inactive.

As stated further above, the first network device may be connected to the second network device via a wired connection or via a wireless connection, for receiving the status information from the second network device. In case of a wireless connection between the first and the second network device, in the first operating mode the status information is received from the second network device using the wireless receiver. In case of a wired connection between the first and the second network device the status information is received from the second network device using the receiver of the wired interface.

In an embodiment of the present method, in the second operating mode the first network device maintains a list of one or more currently associated mobile stations, and monitors the status of respective first wireless links to one or more associated mobile stations. The first network device provides corresponding status information pertaining to the one or more first wireless links link maintained between the first network device and the one or more mobile stations to the second network device. The status information may include information about activity of a link, e.g. data rate, amount of data transmitted, how frequent the network is accessed through the link, etc.

In an embodiment of the present method, the first network device, when in the second operating mode, switches to the first operating mode when no mobile station is associated for a predetermined time period.

In an embodiment of the present method, the first network device, when in the second operating mode, switches to the first operating mode even when one or more mobile stations are associated, when each of the one or more mobile stations can be associated with the second network device. In this embodiment the wireless link between the one or more mobile stations may provide a lower data rate, or even intermittent or temporarily interrupted operation. However, such "lower quality" wireless link may be acceptable for the one or more mobile stations. This decision may be taken based on status information describing the link requirements of the mobile stations. For example, if a home automation device sends a small amount of data a few times over a longer period, and none of the data is time critical, it may be acceptable to send the data at a lower data rate directly to the second network device, or even try repeating sending the data a few times before a successful transmission is accomplished, without using the first network device.

In an embodiment of the present method the first network device receives, while in the second operating mode, from the second network device information about a response to a probe request from the second network device to one or more mobile stations currently associated with the first network device. The first network device determines from the monitored status of wireless links with the one or more currently associated mobile stations and received information about their respective responses to the second network device's probe request, a spatial distance of the one or more mobile station to the first network device and to the second network device. Depending on the determined distance the first network device switches to the first operating mode, i.e. disables its wireless transmitter. The first network device may force the one or more mobile stations to disassociate prior to disabling the wireless transmitter.

In an embodiment of the present method, while in the first operating mode, the first network device transmits, to the second network device the results of determining the spatial distance between the mobile station and the first network device. The second network device uses the received information about the spatial distance and corresponding information it determines by itself for links with associated mobile stations for forcing a disassociation of one or more mobile stations from the second network device when an association with the first network device is possible and advantageous. An association with the first network device may be judged possible and advantageous even before a mobile station would trigger a scanning process based on its own parameters and thresholds. Such forced disassociation is preferably preceded by the first network device switching to the second operating mode, allowing association of mobile stations with the first network device. The forced disassociation from the second network device and the availability of the first network device for association will cause the mobile station to associate irrespective of the parameters and thresholds underlying the roaming mechanism in the mobile station.

Generally, status information pertaining to a wireless link that is used in the context of the present method may comprise one or more from the non-exclusive list including RSSI, MAC address, IP address, connection status, connection speed, frequency and duration of interruptions, channel, frequency band, and availability of alternative network access. The status information transmitted from the second network device to the first network device may comprise different subsets of information items from the status information obtained by probing a mobile station. Also, one or more elements provided in the status information may represent averaged values for the one or more elements, which are obtained from a number of samples and/or over a predetermined time period.

In an embodiment the status information includes data for mobile stations that were previously associated but are currently not associated with the second network device. A message from the second network device to the first network device may include data for this not-connected mobile station, and the data indicating an RSSI value of a link with that mobile station is set to a value indicating a that the mobile station is presently not associated. Such RSSI value is for example set to a value below a noise level, e.g. −100 dB. It is also conceivable to dynamically determine such value depending on a measured noise level when no other mobile station is associated, to adapt the value to individual environmental and interference conditions.

In an embodiment of the present method the first network device switches from the first to the second operating mode only when a mobile station that would otherwise be associated is not connected to the network by an alternative network access. Alternative network access in the context of the present method include, inter alia, wired access, or alternative wireless access methods, e.g. through a mobile telephone network in accordance with the GSM. UMTS or LTE standards, or through a Bluetooth connection.

One or more of the embodiments and developments of the present method described above may be combined. For example, the first network device may be adapted to send probe requests and receive responses thereto as well as to listen to probe requests from mobile stations and take according actions.

A network device adapted for executing one or more embodiments and/or developments of the present method includes a microprocessor, random access memory, or RAM, for storing data and program instruction when executing the present method, and non-volatile memory for storing program instructions and data in accordance with the present method. The network device further includes at least a first wireless interface for providing a wireless link with a mobile station. In this setup the first network device may provide a repeater functionality only at a reduced data rate, due to the necessity to alternatingly connect to the second network device and the mobile station. Data received and to be transmitted is intermediately stored in the memory until transmission is complete.

In a development the network device has a second wireless interface, allowing for establishing independent connections with the second network device and the mobile station. This mode will allow for transmitting data at the full data rate. The first and second wireless interfaces may operate in different channels of the same frequency band, or in different frequency bands.

In a development the network device has a wired network interface, either in place of the second wireless interface or in addition, allowing for establishing independent connections with the second network device and the mobile station.

ADVANTAGE

The present method provides several advantages. First of all the method offers an opportunity to trigger power saving mechanisms. As a repeater embeds both access point and a client functionality its full operation will consume more power than each of the devices, i.e. access point or client, individually. The IEEE 802.11 standard does not define a repeater role, and thus there are no dedicated power saving mechanisms assigned to the repeater role. The present method allows for dynamically switching between these roles, from AP to client, in which known power saving techniques can be applied. Given the fact that some repeaters are only required during a limited time of a day, or only on certain days of a week, substantial power saving can be realized.

Second, the present method directly influences the airtime availability, i.e. the interference with other networks. As each repeater embeds an access point it will at least consume 2% of the available airtime by sending beacons, e.g. at the standard interval of 100 ms. If multiple repeaters in the environment start beaconing the available airtime can easily be reduced by 10%. This has a negative effect on the amount of data that can be transmitted over the shared medium. In combination with the fact that some repeaters are only used sporadically it is obvious that they do not need to claim airtime when not used. The present method prevents repeaters unnecessarily using airtime and thus overall ensures a more efficient use of the shared medium.

DESCRIPTION OF DRAWINGS

In the following the method will be described with reference to the drawings, in which.

DESCRIPTION OF EMBODIMENTS

Throughout the figures identical or similar elements are referenced to by the same reference designators.

Figure 1:
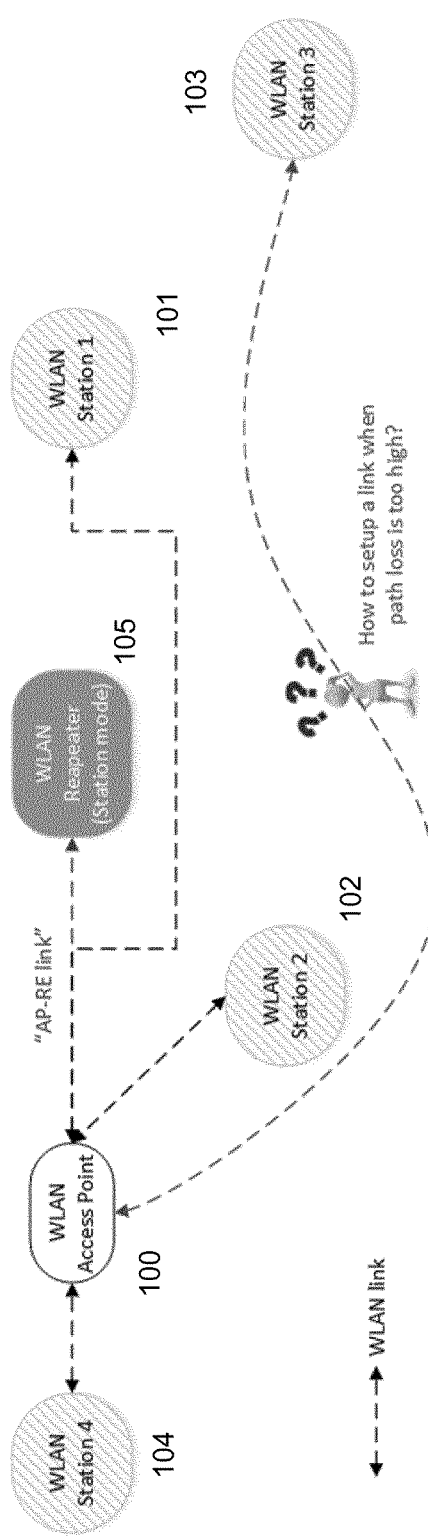
FIG. 1 shows a first schematic view of connections in an exemplary wireless LAN environment.

FIG. 1 shows a first schematic view of connections in an exemplary wireless LAN environment. The environment presented in this figure covers a common basic scenario. There is a main access point 100, which is typically integrated in a broadband access gateway, and a few client devices, or stations, 101, 102, 103. Some stations are connected to main access point 100 with good link quality, e.g. stations 102 and 104. Station 101 is connected with poor link quality, and station 103 has difficulties to establish a connection at all. The wireless setup also has a repeater 105, which has been installed to improve wireless LAN coverage of the home network. When repeater 105 is enabled the WLAN network is optimized to its full potential as is illustrated in FIG. 2.

Figure 2:
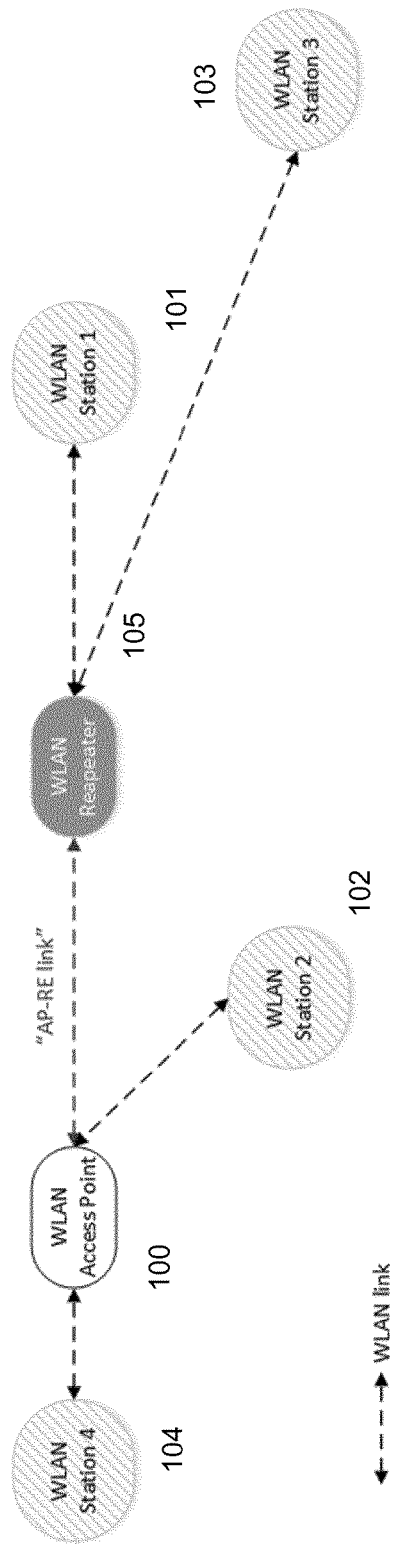
FIG. 2 shows a second schematic view of connections in the exemplary wireless LAN environment of FIG. 1.

In FIG. 2, which shows a second schematic view of connections in the exemplary wireless LAN environment of FIG. 1, the repeater is used for expanding the network. Those stations which had weaker connections in FIG. 1, i.e. stations 101 and 103, have established a wireless connection with repeater 105, which offers an improved link quality. Higher link quality generally means a higher physical layer speed hence a better ability to share the medium that is available. There will be few—if any—bad apple devices left in the environment. The use case illustrated in FIG. 2 can be easily covered with a static repeater configuration. However it might happen that station 103 is only enabled once in a while and that Station 101 is a mobile device that is only used to access the internet at low speeds, e.g. internet browsing at speeds lower than 5 Mbps, or WLAN enabled speaker for audio streaming. At this point the repeater, in accordance with the present method, can save power by disabling the repeater function and resorting back to performing a listener-only function much like a regular station device. I.e., the repeater will only use the receiver and disable the transmitter. In order to further save power the repeater may go into deep power save, waking up only in intervals for determining if it needs to activate itself and act as a regular repeater. Thus, the repeater needs a mechanism to get out of the deep power save state and re-enable the repeater function.

Figure 3:
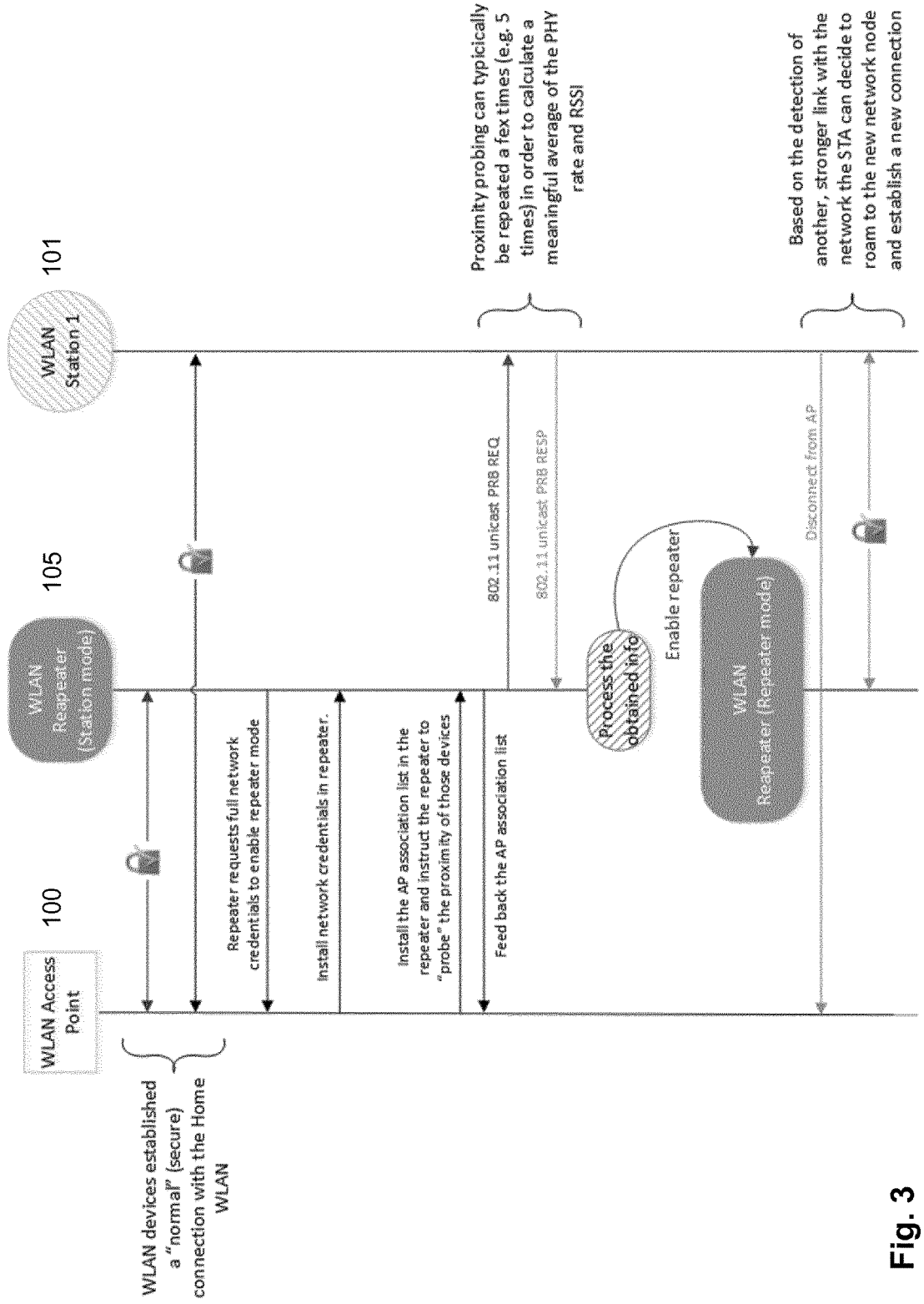
FIG. 3 illustrates an exemplary message and action sequence in accordance with a first embodiment of the present method.

FIG. 3 illustrates an exemplary message and action sequence showing how a repeater implementing the present method transitions from station mode, i.e. listening only and/or being in deep power save, into a regular repeater state. Assume WLAN station 101 is a mobile device that moves from a location close to main access point 100 to a position where it is closer to the repeater and at the same time far enough from main access point 101 to start experiencing drops in the physical layer speed, hence will experience slower download speeds for internet traffic. In order to be able to assess if the repeater mode must be enabled in repeater 105 or if it can stay in the power saving mode—repeater 105 is currently in low power STA mode—repeater 105 must perform some form of proximity detection. This is needed to determine if the target device, i.e. station 101, is closer to the repeater or to the main access point, since the goal is to reduce unnecessary associations and disassociations in the network. Repeater 105 obtains this proximity information by sending an IEEE 802.11 probe request to the station 101 and by accordingly analyzing the IEEE 802.11 probe response frame. In order to determine the spatial location of station 101, the repeater also needs to know how close station 101 is to main access point 100. Main access point 101 provides this information to repeater 105 by periodically, e.g. each minute, or each 10 seconds, publishing a list of associated stations and the respective RSSI level at which main access point 100 receives data frames from the station in the list. The list is installed in the repeater 105 and the repeater 105 is instructed to probe those stations. Access point 100 also publishes the MAC address of the connected devices, the current and/or historical, i.e. previous, RSSI level, and the current connection status.

The list may generally have the format:

AP_association list=[MAC_X,RSSI_X,CONNSTATUS_X;MAC_Y, RSSI_Y,CONNSTATUS_Y; . . . .]

In this exemplary embodiment repeater 105 receives a list item like:

[MAC_Station101,RSSI_Station101,Y],

With "MAC_Station101" corresponding to the MAC address, "RSSI_Station101" corresponding to the RSSI value of the connection, and "Y" indicating that the connection is active.

The repeater application then compares the received RSSI value represented by RSSI_Station1 with the RSSI value determined from the probe response to decide whether or not to enable the repeater function.

Figure 4:
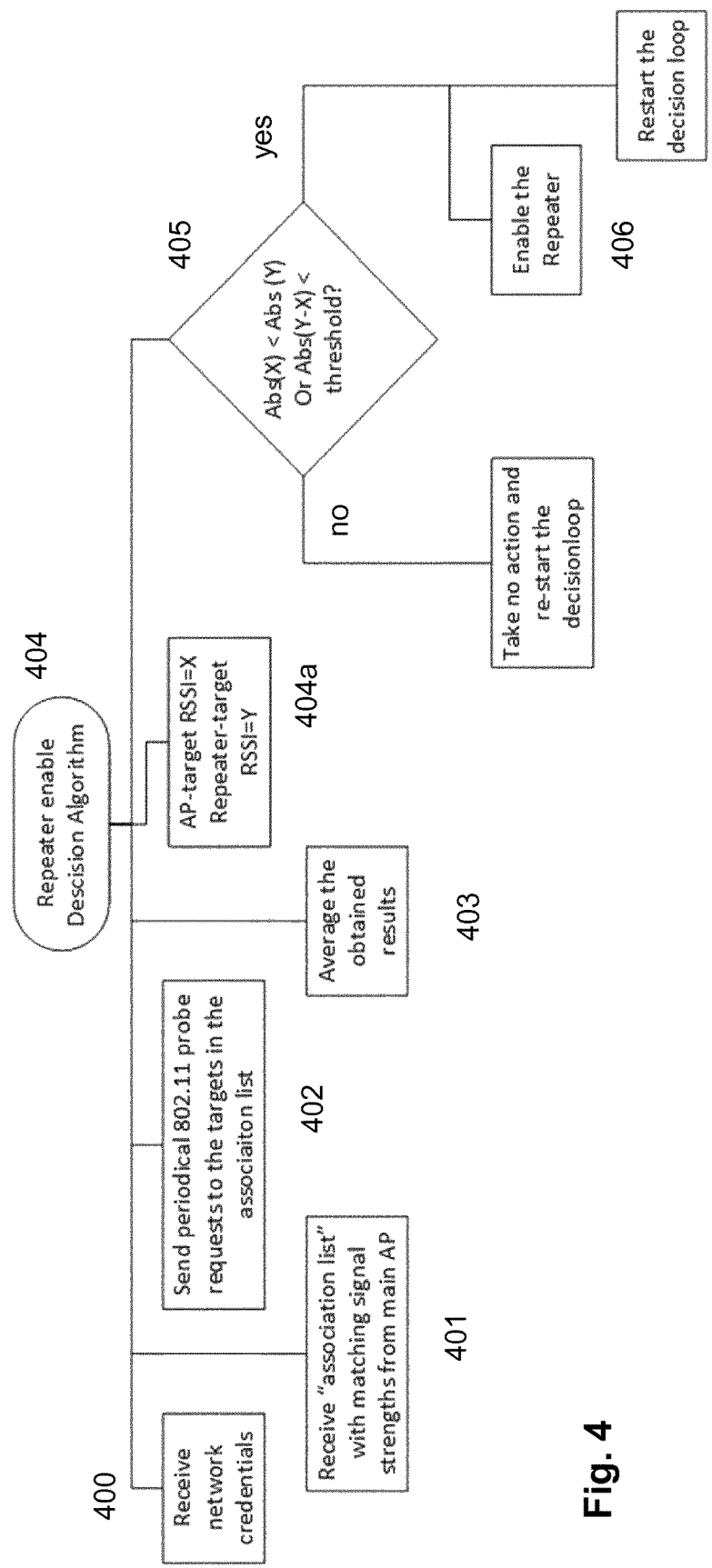
FIG. 4 illustrates process steps and inputs in accordance with an embodiment of the present method.

This process is illustrated in FIG. 4. The reference numerals used for devices correspond to the ones used in FIGS. 1 and 2. The devices are not shown in the figure. First, in step 400, repeater 105 receives initial setup data including network credentials, in order to be able to provide the range extension for main access point 100. Next, in step 401, repeater 105 receives a copy of the AP_association_list discussed above. In order to determine the distance to stations, repeater 105 sends probe requests to the targets found in the AP_association_list, step 402, and receives the corresponding responses (not shown). Preferably, repeater 105 sends a number of such requests and receives a corresponding number of responses, if any, allowing for averaging or filtering the results for reducing outliers and errors, step 403. Once repeater 105 has sufficient data, it executes the process for deciding whether or not to enable the repeater functionality, step 404. For this purpose, repeater 105 accesses RSSI values of connections between the main AP 100 and the station and between repeater 105 and the station, step 404a.

In order to prevent too easy enabling of repeater 105 or to prevent unnecessary alternating associations and disassociations of stations, repeater 105 only enables the repeater functionality when the absolute RSSI value determined from the probe response is larger than the value received in the association list of main access point 100, as this would be an indication that station 101 is closer to the repeater, or if the difference between the RSSI values exceeds a predetermined threshold, e.g. 6 dB, which would indicate that there is a substantial difference in the RSSI value, e.g. caused by differences in path loss, and which suggest that connecting station 101 to the repeater 105 rather than to main access point 100 would be advantageous. This is shown in step 405: repeater 105 compares the absolute values of the RSSI values for one station or the difference between the RSSI values for that station and a predetermined threshold. If the RSSI value of an existing connection between the station and the main AP is larger than that of a possible connection between the station and repeater 105, or if the difference between the RSSI values is below the threshold, no action is taken and the probing, evaluating and deciding is started over, no-branch of step 405. Otherwise, yes-branch of step 405, the repeater functionality is enabled, step 406, and the probing, evaluating and deciding is started over.

Preferably, the decision loop is run periodically, e.g. every minute, or every 10 seconds, to ensure that, in case there is no active connection on repeater 105, repeater 105 can transition back to station mode and go into power save, stopping sending signals over the air interface that are useless or even detrimental to the network (not shown).

With regard to determining RSSI values it is obvious that some level of averaging is required to establish a stable RSSI reading. This may require that the probe request/response procedure is repeated a few times, e.g. five times, allowing for a simple linear average to be calculated.

In order to achieve maximum power conservation in the first operating mode, i.e. in station mode, repeater 105 can simply run a network monitor. Such network monitor allows for a station to shut down all but one receiver chains and switch into 20 MHz modulation mode, which, at present, for WLAN in accordance with IEEE 802.11, represents the mode consuming the lowest power. In this mode no energy is used for sending probe requests in order to trigger a probe response, or for powering more receiver chains than required for this purpose. Repeater 105 will simply monitor all—if any—incoming probe responses triggered by probe requests issued by other devices, and filter the probe responses using the AP_association_list (see above) that has previously been stored in repeater 105. The repeater is, at this point, not even obliged to remain associated or connected with the main AP; it can stay in low power mode until it determines that a device of interest is within range. In case new devices are discovered, i.e. devices that had not been associated before, the repeater—in station mode—can re-establish the connection with the main AP and allow updating the AP_association_list.

The method presented with reference to FIGS. 3 and 4 may be considered as the basic method providing dynamic repeater role switching. Certain specific user scenarios, however, may not be properly addressed using the basic method. Consider station 103 as illustrated in FIG. 1, or station 101 without assuming it is moving from main AP 100 into the direction of repeater 105. If it is further assumed that these two stations are generally out of range of the main access point, main AP 100 is not able to send probe target information to repeater 105 and as a consequence repeater 105 will not try to enable the repeater function, and the two stations will remain disconnected from the network.

Figure 5:
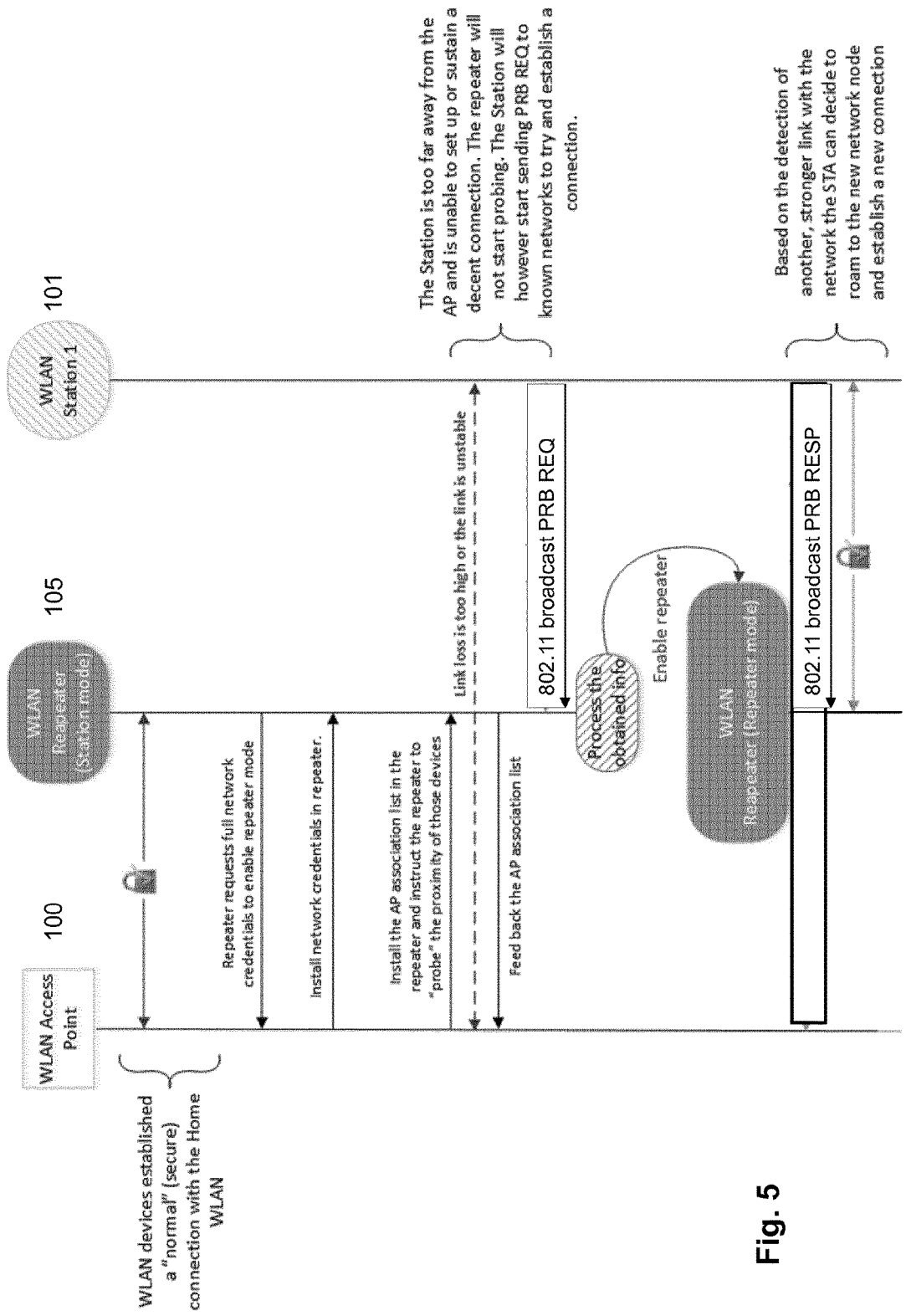
FIG. 5 illustrates an exemplary message and action sequence in accordance with a second embodiment of the present method.

A development of the present method illustrated in FIG. 5 addresses this scenario. The first few steps, or message exchanges, correspond to those described with reference to FIG. 4, i.e., repeater 105 receives initial setup data including network credentials, in order to be able to provide the range extension for main access point 100, and receives a copy of the AP_association_list discussed further above. The dashed-line arrow indicates that the link between station 101 and main AP 100 is unstable, shows bad performance, or is broken.

Figure 6:
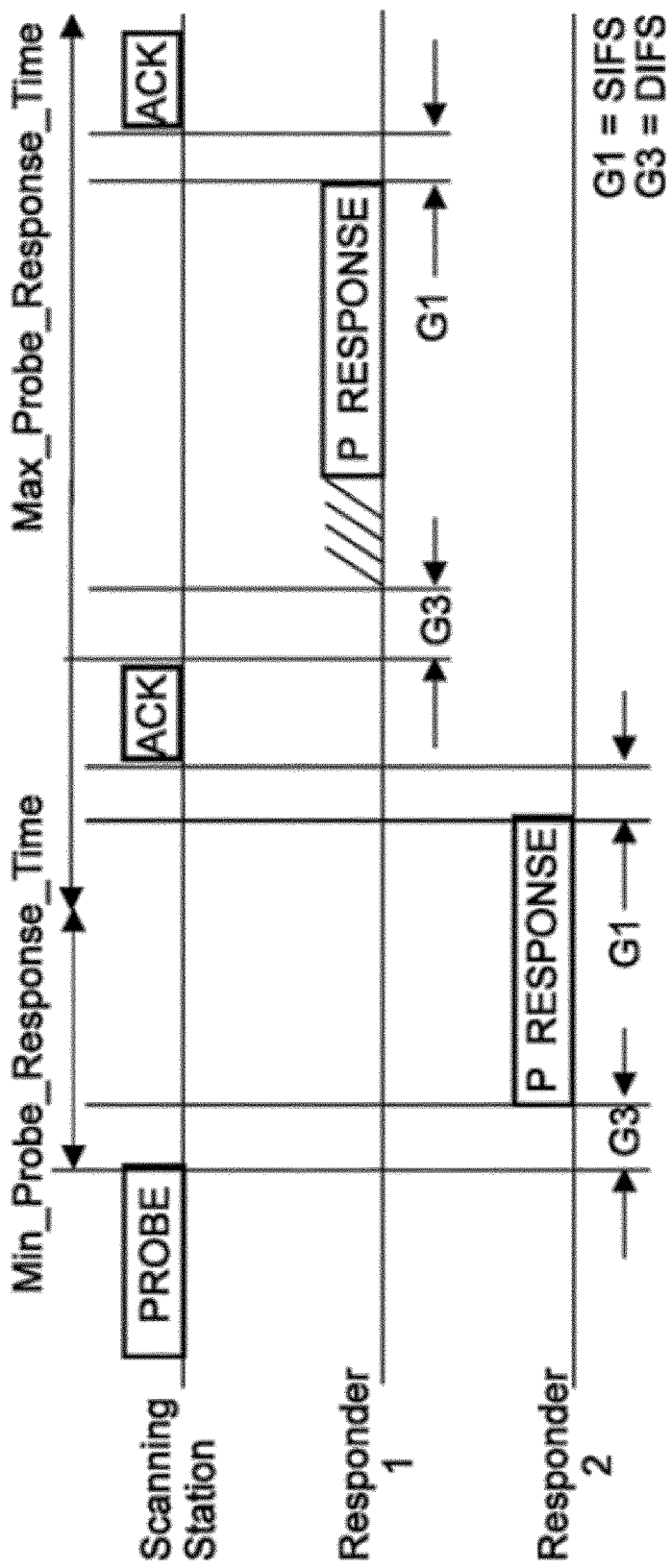
FIG. 6 depicts a scanning process as stipulated in the IEEE 802.11 standard.

As per the assumption above, station 101 effectively is out of the wireless range of main AP 100 and cannot establish a reliable connection. A further important prerequisite is that station 101 has previously been connected to main AP 101 at least once. For example, station 101 may be a device that was powered down after leaving the wireless range, e.g. after having lost connection to main AP 100. Station 101 may also be a device that has been powered down and moved out of the wireless range afterwards. When station 101 is switched on again it does not "see" a network, since repeater 105 is still in station mode and main access point 100 is out of reach due to limited transmit power and limited receiver sensitivity. The normal reaction of a station in this state is to revert to active scanning, as illustrated in FIG. 6. FIG. 6 schematically describes how scanning is handled in accordance with the IEEE 802.11 standard and will not be described in detail in this specification.

Reverting to FIG. 5, In accordance with the development of the present method, station 101 will send out a broadcast probe request. It is to be noted that it is unpredictable what the value of the SSID information element will be as this option is determined by station 101's software. According to IEEE 802.11-2012 two variants of an active scan exist. Either the scanning station sends a probe request to a broadcast destination address and fills in a "wildcard" value for the SSID information element. In this case, all APs must answer with a probe response message allowing the station to select one, which usually is one for which credentials are available and the which has the highest RSSI. In a second variant the scanning station sends out a probe request to a broadcast address but sets the value of the SSID information element to the value of the network it is trying to probe based on existing configuration data in the station. In this case only the AP or repeater with matching SSID value should answer with a probe response.

For the repeater detection in accordance with the present method both options must be supported, so if the repeater is in station mode it must monitor both broadcast probe requests and unicast probe responses. The responses must be received at least a DIFS interval after the transmission of a probe request (see FIG. 6). For those stations that are out of reach the repeater must keep monitoring broadcast probe requests. The example in which the SSID information element has been filled in and it matches with the SSID configuration stored in the repeater is shown in FIG. 5: the repeater automatically switches from station mode to repeater mode and may optionally issue a probe response, if still within the delays shown in FIG. 6. In any case, once the repeater is enabled station 101 associates with the repeater.

In case the SSID information element does not match, or a wildcard is used, additional information is needed, since the repeater does react on any arbitrary probe request from any device. This case can be handled in accordance with a development of the present method, in which the AP not only publishes the active associations but also the associations that had previously occurred at least once. In other words, the AP publishes a "historic" overview of the devices that had previously established a connection with the AP. The historic devices are added to the AP association list with respective RSSI_X values set to a value that indicates that they cannot currently be attached. This value may for example be −100 dB, because typically the RSSI never exceeds −95 dBm in operational use. The actual value to be used is specified beforehand. The connection status must be set to "N" for these devices, indicating that the devices are currently not associated. The repeater also stores historic associations, e.g. in order to be able to handle a case in which some non-moving device never connects with the main access point, and publishes the repeater-internal list back to the AP. The AP updates the AP-internal association list accordingly. As mentioned before, this allows for devices that exclusively connect or have previously connected exclusively to the repeater to be considered in the repeater role decision process. In any case, the main AP must be aware of all devices that are or were active in the network, since the main AP must decide what devices shall assume the repeater function or not. In the repeater role decision process the AP must bear in mind that repeater daisy-chaining is not allowed in order to prevent occurrence of hidden node effects, and that some chipset vendors only allow a single repeater to be active in the network, e.g. for ease of channel selection propagation especially in conjunction with dynamic frequency selection, or DFS.

If a broadcast probe request is received with wildcard SSID information element value, the repeater crosschecks the transmitter address (TA) or source address (SA) against the list of currently connected and previously connected devices in order to validate the request and transition from station to repeater mode.

Figure 7:
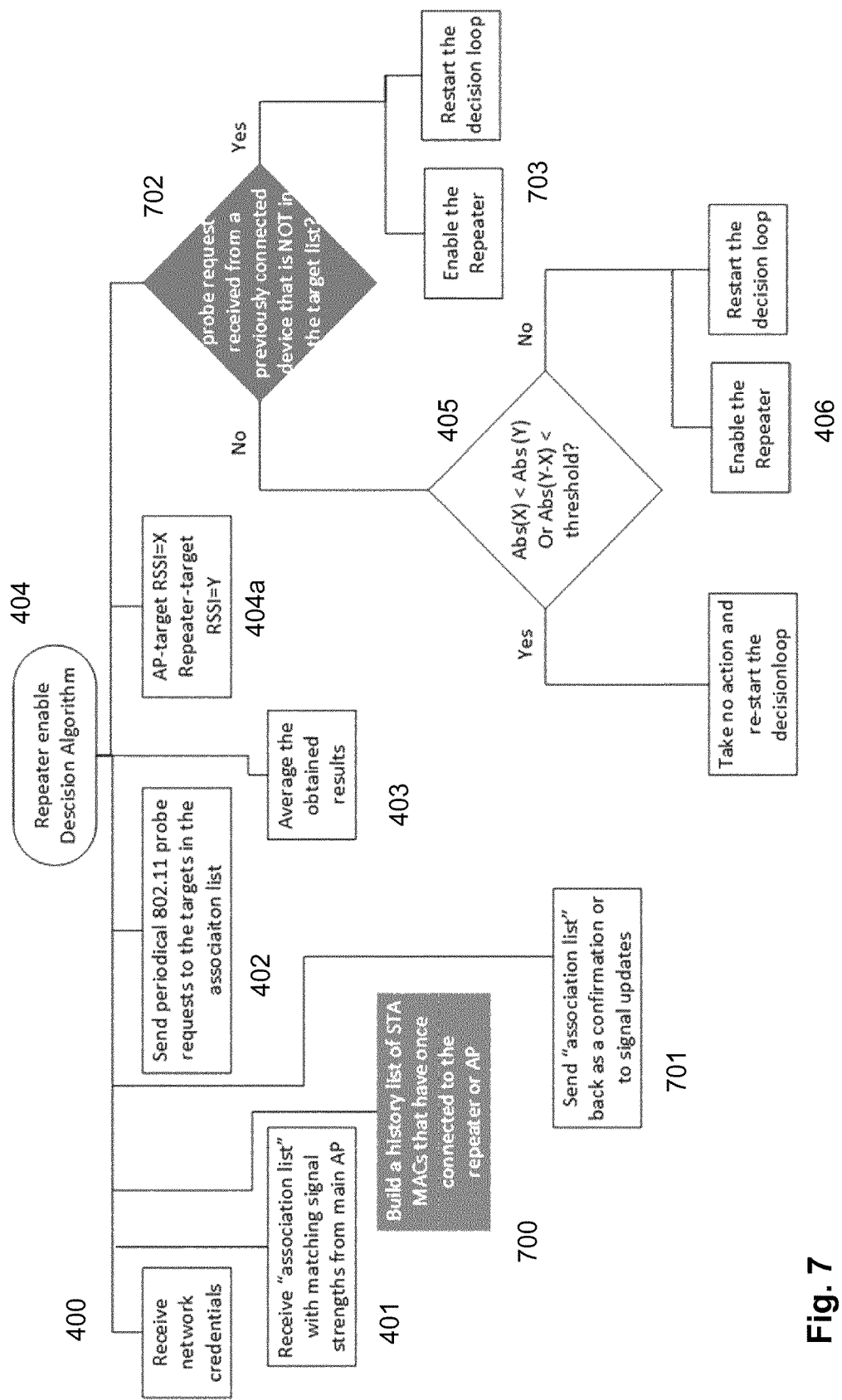
FIG. 7 illustrates process steps and inputs in accordance with the second embodiment of the present method.

FIG. 7 illustrates process steps and inputs in accordance with the embodiment of the present method discussed with reference to FIG. 5. The process is based on the steps discussed with reference to FIG. 4, and the reference numerals from FIG. 4 in the 400-range are used where appropriate. Steps added for this embodiment are referenced by reference numerals in the 700-range.

Like in the discussion of FIG. 4 the reference numerals used for devices correspond to the ones used in FIGS. 1 and 2, and the devices are not shown in the figure. First, in step 400, repeater 105 receives initial setup data including network credentials, in order to be able to provide the range extension for main access point 100. Next, in step 401, repeater 105 receives a copy of the AP_association_list discussed above, and in step 700 repeater 105 builds and maintains a list of stations that previously had established a connection. In step 701 repeater 105 sends back an association list as a confirmation or for providing updates to main AP 100. In order to determine the distance to stations repeater 105 sends probe requests to the targets found in the AP_association_list, step 402, and receives the corresponding responses (not shown). Preferably, repeater 105 sends a number of such requests and receives a corresponding number of responses, if any, allowing for averaging or filtering the results for reducing outliers and errors, step 403. In step 702 receiver 105 checks if a probe request from a previously connected device that is not in the target list is received. If not, no-branch of step 702, repeater 105 executes the process 404 for deciding whether or not to enable the repeater functionality as described with reference to FIG. 4. For this purpose repeater 105 accesses RSSI values of connections between the main AP 100 and the station and between repeater 105 and the station, step 404a. In order to prevent too easy enabling of repeater 105 or to prevent unnecessary alternating associations and disassociations of stations, repeater 105 only enables the repeater functionality when the absolute RSSI value determined from the probe response is larger than the value received in the association list of main access point 100, as this would be an indication that station 101 is closer to the repeater, or if the difference between the RSSI values exceeds a predetermined threshold, e.g. 6 dB, which would indicate that there is a substantial difference in the RSSI value, e.g. caused by differences in path loss, and which suggest that connecting station 101 to the repeater rather than to main access point 100 would be advantageous. This is shown in step 405: repeater 105 compares the absolute values of the RSSI values for one station or the difference between the RSSI values for that station and a predetermined threshold. If the RSSI value of an existing connection between the station and the main AP is larger than that of a possible connection between the station and repeater 105, or id the difference between the RSSI values is below the threshold no action is taken and the probing, evaluating and deciding is started over, no-branch of step 405. Otherwise, yes-branch of step 405, the repeater functionality is enabled, step 406, and the probing, evaluating and deciding is started over.

If a probe request from a previously connected device that is not in the target list is received, yes-branch of step 702, repeater 105, which is still in station mode enables the repeater functionality, step 703. If no such request is received evaluating and deciding is started over.

Preferably, the decision loop is run periodically, e.g. every minute, or every 10 seconds, to ensure that, in case there is no active connection on repeater 105, repeater 105 can transition back to station mode and go into power save, stopping sending signals over the air interface that are useless or even detrimental to the network (not shown). It is obvious that listening for probe requests from stations that were previously connected to the repeater can be done continuously.

Figure 8:
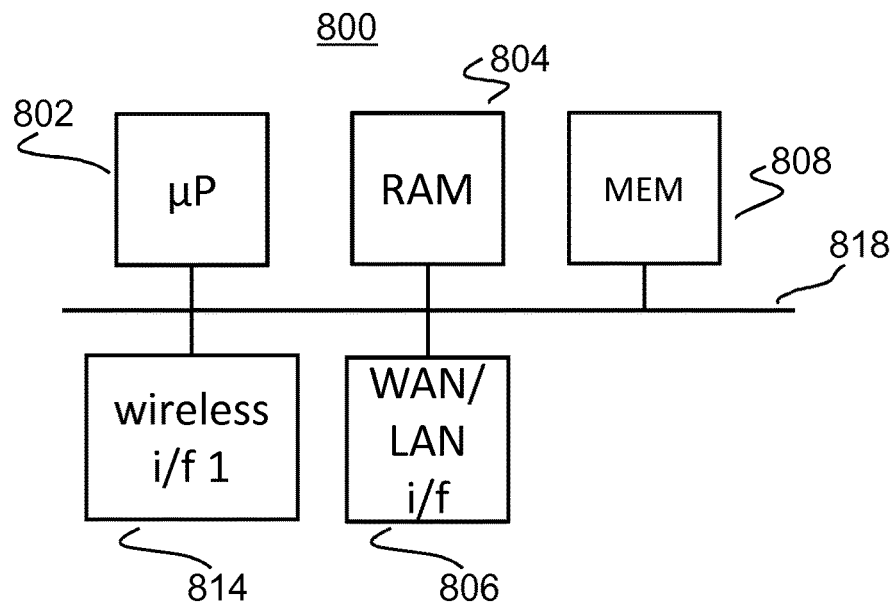
FIG. 8 shows an exemplary schematic block diagram of a first network device suitable to perform the present method.

FIG. 8 shows an exemplary schematic block diagram of a first network device 800 suitable to perform one or more embodiments and/or developments of the method presented in this specification. Microprocessor 802 is linked to random access memory (RAM) 804, wide area network (WAN) and/or local area network (LAN) interface 806, non-volatile memory 808 and wireless interface 816 via data bus 818. Data bus 818 is not necessarily a single data bus but may also be implemented as a system of separate buses each connecting all or only some components of the network device, as appropriate and required for control and data flow. Non-volatile memory 808 holds program instructions which, when executed by microprocessor 802, perform one or more of the various aspects and embodiments of the method described in this patent specification. The microprocessor is of a commonly known and used type and may be constructed in accordance with any suitable one of the known architectures, e.g. x86, x86-64, ARM, MIPS, etc. Random access memory 804 may temporarily store data and/or program instructions when performing the method. The non-volatile memory may be implemented through hard disk drives (HDD), Flash-Memory, or a combination thereof. Other non-volatile memory types such as MRAM, optical storage, etc. can also be used in the AP without leaving the scope of the present invention. Network device 800 is connected to main AP 100 (not shown) through WNA/LAN interface 806. However, The connection to main AP 100 may also be established using wireless interface 814. In this case WAN/LAN interface 806 may be omitted.

Figure 9:
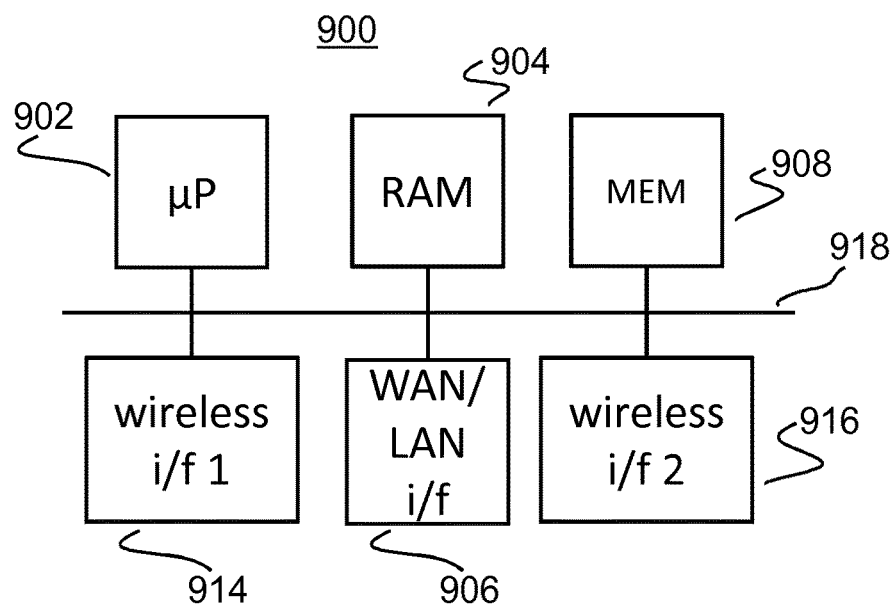
FIG. 9 shows an exemplary schematic block diagram of a second network device suitable to perform the present method shows.

FIG. 9 is an exemplary schematic block diagram of a second network device 900 suitable to perform one or more embodiments and/or developments of the method presented in this specification. Network device 900 comprises all elements shown and discussed with reference to FIG. 8, and the corresponding elements are referenced with similar reference numerals in the 900-range. In addition to the network device shown in FIG. 8 network device 900 of FIG. 9 has a second wireless interface 916, allowing, inter alia, for concurrent wireless data traffic with main AP 100 and probing with non-associated stations, as described further above in one or more aspects of the invention. The second wireless interface 916 may also be used for establishing wireless communication connections on a different channel and/or in a different frequency range. If communication with main AP 100 is established via second wireless interface 916, WAN/LAN interface 806 may be omitted.

In FIGS. 8 and 9 general elements of an electronic device like user interface, power supply and the like, are omitted for clarity reasons. However, such elements, even though not shown, are present in network devices that are suitable for and adapted to perform the method presented in this specification.

It will be appreciated by those skilled in the art that the block diagrams presented herein represent conceptual views of illustrative system components and/or circuitry embodying the principles of the invention. Similarly, it will be appreciated that any flow charts and the like represent various processes which may be substantially represented in computer readable storage media and so executed by a computer or processor, whether or not such computer or processor is explicitly shown.

Although the invention was described above with reference to the examples shown in the appended drawings, it is obvious that the invention is not limited to these, but may be modified by those skilled in the art without departing from the scope and spirit of the invention. For example, the invention is not restricted to WLAN networks according to the IEEE 802.11 standard only, but can be used in connection with other wireless systems, such as systems based on the BRAN (Broadband Radio Access Networks) standard, or any other network type in which a mobile station is connected to a single AP at a time.

The invention claimed is:

1. A method of selectively enabling one of a first and a second operating mode in a repeater, the repeater providing access to a network, the repeater having a wireless receiver and a wireless transmitter for providing bi-directional communication with a mobile station through a first wireless link, wherein, in the first operating mode, the wireless transmitter is not continuously enabled, and wherein, in the second operating mode, the wireless transmitter is continuously enabled, the method comprising, at the repeater and in the first operating mode:
   receiving, from an access point, status information about a second wireless link between the access point and the mobile station;
   receiving, a probe message from the mobile station; and
   depending on a distance of the mobile station to the repeater and to the access point determined based on the received status information and information provided by the probe message from the mobile station, switching to the second operating mode, the second operating mode allowing association of the mobile station with the repeater via the first wireless link and providing wireless communication for the mobile station with the access point through the first wireless link and through the repeater.

2. The method of claim 1, wherein, in the second operating mode, the method further includes, at the repeater:
   maintaining a list of associated mobile stations;
   monitoring a status of the first wireless link; and
   sending, to the access point, status information about the first wireless link maintained between the repeater and the mobile station.

3. The method of claim 1, wherein the method further includes, at the repeater:
   receiving, from the access point, a list of mobile stations associated to the access point;
   installing the list in the repeater; and
   probing by the repeater the proximity of the associated mobile stations as included in the list.

4. The method of claim 1, further including, at the repeater and when in the second operating mode:
   switching to the first operating mode when no mobile station is associated for a time period.

5. The method of claim 2, further including, at the repeater:
   receiving, in the second operating mode, from the access point, information about a response to a probe request from the access point to the mobile station;
   determining from the monitored status and received information about the response to the probe request, a spatial distance of the mobile station to the repeater and to the access point; and
depending on the determined distance, switching to the first operating mode.

6. The method of claim 5, further including, at the repeater:
   forcing disassociation of the mobile station prior to switching to the first operating mode.

7. The method according to claim 1, wherein status information includes one or more of RSSI, MAC address, IP address, connection status, connection speed, channel, frequency band, and availability of alternative network access means.

8. The method according to claim 1, wherein status information includes data for mobile stations that were previously associated but are currently not associated with the access point, and wherein an RSSI value of a link with that mobile station is set to a value indicating a non-existent active association.

9. The method according to claim 1, wherein the repeater switches from the first to the second operating mode only when a mobile station is not connected to the network by an alternative network access.

10. A repeater providing access to a wireless network, comprising:
    a first wireless interface with a wireless receiver and a wireless transmitter for providing bi-directional communication with a mobile station through a first wireless link, and
    a microprocessor and a memory storing data and program instructions, which, when executed, cause the repeater to selectively enable one of a first and a second operating mode in the repeater,
    wherein, in the first operating mode, the wireless transmitter is not continuously enabled, and wherein, in the second operating mode, the wireless transmitter is continuously enabled, and
    wherein, in the first operating mode, the repeater is enabled to:
    receive, from an access point, status information about a second wireless link between the access point and the mobile station;
    receive, at the wireless receiver, a probe message from the mobile station;
    determine, from the received status information and information provided by the probe message from the mobile station, a spatial distance of the mobile station to the repeater and to the access point; and
    switch, depending on the determined distance, to the second operating mode, the second operating mode allowing association of the mobile station with the repeater via the first wireless link and providing wireless communication for the mobile station with the access point through the first wireless link and through the repeater.

11. The method according to claim 1, wherein the probe message received by the repeater is a probe request from the mobile station.

12. The method according to claim 1, wherein the probe message is a response from the mobile station to a probe request previously sent from the repeater to the mobile station.

* * * * *